United States Patent

Seymour

[11] Patent Number: 5,772,239
[45] Date of Patent: Jun. 30, 1998

[54] AIRBAG SUB-MODULE HAVING FABRIC ENVELOPE WITH HORN SWITCH

[75] Inventor: Brian T. Seymour, Bloomfield, Mich.

[73] Assignee: Takata, Inc., Auburn Hills, Mich.

[21] Appl. No.: 669,616

[22] Filed: Jun. 24, 1996

[51] Int. Cl.⁶ .................................................. B60R 21/20
[52] U.S. Cl. .................... 280/728.3; 280/731; 200/61.54
[58] Field of Search ............................... 280/731, 728.1, 280/728.3, 728.2, 732, 743.1; 200/61.54

[56] References Cited

U.S. PATENT DOCUMENTS

| | | | |
|---|---|---|---|
| 3,714,844 | 2/1973 | Tsuda | 280/731 |
| 3,819,205 | 6/1974 | Dunford et al. | 280/731 |
| 4,148,503 | 4/1979 | Shiratori et al. | 280/731 |
| 4,828,286 | 5/1989 | Fohl | 280/731 |
| 4,995,638 | 2/1991 | Shinto et al. | 280/731 |
| 5,005,860 | 4/1991 | Mori et al. | 280/731 |
| 5,062,664 | 11/1991 | Bishop et al. | 280/728.2 |
| 5,186,490 | 2/1993 | Adams et al. | 280/731 |
| 5,242,192 | 9/1993 | Prescaro et al. | 280/732 |
| 5,342,086 | 8/1994 | Harris et al. | 280/728.3 |
| 5,369,232 | 11/1994 | Leonelli | 200/61.54 |
| 5,399,819 | 3/1995 | Lang et al. | 200/61.54 |
| 5,423,569 | 6/1995 | Reighard et al. | 280/731 |
| 5,431,437 | 7/1995 | Nichols et al. | 280/731 |
| 5,449,197 | 9/1995 | Kerner | 280/731 |
| 5,452,913 | 9/1995 | Hansen et al. | 280/728.1 |
| 5,470,099 | 11/1995 | Williams | 280/728.2 |
| 5,498,030 | 3/1996 | Hill et al. | 280/728.1 |
| 5,562,301 | 10/1996 | Lutz | 280/731 |
| 5,584,501 | 12/1996 | Walters | 280/731 |
| 5,626,358 | 5/1997 | Ricks et al. | 280/731 |

FOREIGN PATENT DOCUMENTS

| | | | |
|---|---|---|---|
| 3-5257 | 1/1991 | Japan | 280/728.3 |

*Primary Examiner*—Peter C. English
*Attorney, Agent, or Firm*—Harness, Dickey & Pierce, PLC

[57] ABSTRACT

A supplemental restraint sub-module configured for integral use with a vehicle steering wheel comprising an air bag and an inflator enclosed in a fabric envelope. The sub-module is designed to be incorporated into a well in the central hub section of a steering wheel and is configured to use the well walls and steering wheel mounting plate as reaction surfaces during air bag deployment. The sub-module design eliminates the need for a module housing and thus is smaller and lighter than traditional modules. A membrane horn switch and backing plate can also be incorporated into the sub-module design. The reduced number of parts needed to manufacture the sub-module of the present invention allows the sub-module to be manufactured at a cost reduction. The reduced size and weight of the sub-module allows room for turn signal, light controls, wiper controls and redundant accessory switches to be attached by allowing extra room for the electronics needed to operate these functions.

9 Claims, 4 Drawing Sheets

AIRBAG SUB-MODULE HAVING FABRIC ENVELOPE WITH HORN SWITCH

BACKGROUND OF THE INVENTION

1. Field of the Invention

The present invention relates to inflatable restraint systems for providing impact protection for the occupants of a motor vehicle. More particularly, the present invention relates to a supplemental restraint sub-module for integrated use with a vehicle steering wheel.

2. Background Information

Inflatable restraint systems are now commonly utilized for impact protection as supplemental restraints which are generally intended to be used with belt restraint systems. Driver air bag restraint systems are typically mounted on vehicle steering wheels, and inflate during a collision in response to an electrical signal generated from one or more crash sensors mounted to the motor vehicle. The inflated air bag provides energy absorption for an occupant during a vehicle impact. Additionally, the air bag improves the contact surface for the occupant with the vehicle interior during a frontal crash.

A typical air bag module consists of the following parts: a housing structure, an air bag, an inflator, a triggering mechanism, and fasteners. The housing provides a structure for mounting the air bag to the air bag module and a mounting surface to attach the module to the vehicle steering wheel, as well as provides reaction surfaces configured to control and direct the air bag during inflation. The inflator is usually either a stored gas or solid propellant device which provides the fluid for the rapid filling of the air bag. Also, current modules typically use a number of fasteners to attach the module components and to attach the module to the vehicle structure.

The principal concerns in the design of air bag modules are the manufacturability of the product, its cost and reliability. As millions of air bag modules are placed into automobiles every year a few grams savings in weight or a few less parts can have a significant economic effect. Despite the effort exerted in optimizing the design of these devices, there is a continuing need to improve the manufacturability and cost of the systems while maintaining their reliability. Of significant importance is the reduction in the number of separate components which must be assembled to build the inflatable restraint system. The existence of a multiplicity of parts has a negative cost effect, both in terms of part fabrication and assembly.

In motor vehicle design today, size and mass constraints are also of critical importance. To make effective use of packaging volume in the automobile, it is desirable to reduce the overall size of an air bag module. This is especially true for modules designed to be integrated into vehicle steering wheels. Since the module is generally integrated into a central hub of the vehicle steering wheel, its size must be minimized in order not to obstruct the vehicle operator's view of the vehicle instrument panel. Furthermore, modules designed to be integrated into a vehicle steering wheel provide additional challenges such as incorporating the vehicle horn switch into the module design and allowing room on the steering wheel for additional accessory switches such as turn signals, light controls, wiper controls, etc. Moreover, efforts to achieve benefits in these areas must not sacrifice the performance of the restraint system.

Thus, there is a need for an improved supplemental restraint sub-module for integrated use with a vehicle steering wheel which is simple in design and compact in size. There is a further need for an improved supplemental restraint sub-module which is easy to assemble and install and has a minimum number of parts. There is a still further need for an improved supplemental restraint sub-module for integrated use with a vehicle steering wheel which incorporates a vehicle horn switch into the sub-module.

SUMMARY OF THE INVENTION

The sub-module of the present invention includes an air bag and an inflator enclosed in a fabric envelope. A primary object of the present invention is to provide an improved supplemental restraint sub-module design which is smaller, lighter, and has fewer parts than prior art sub-modules. These advantages make the sub-module easier and faster to assemble and more cost effective to produce. Furthermore, the improved sub-module allows for greater visibility of the vehicle instruments by the vehicle operator as well as additional space on or near the steering wheel for accessory switches.

The improvements provided by the present invention are achieved through an efficient integration of components and functions of the sub-module and vehicle steering wheel. The sub-module of the present invention is configured to be installed in a well formed in the central hub of a vehicle steering wheel and is designed to use the well side walls as reaction surfaces during air bag deployment. Furthermore, the sub-module is configured as a "drop-in" sub-assembly which is easily mounted in place. With this configuration, the module housing required in traditional steering wheel inflatable restraint system can be eliminated. Furthermore, the resulting lighter steering wheel reduces the moment of inertia of the steering wheel which can provide improved handling response.

A membrane horn switch can also be incorporated into the sub-module of this invention. The membrane horn switch may be sewn into the fabric envelope along with a back plate. The switch can be positioned beneath the steering wheel cover and can be configured to deform when pressure is applied to the steering wheel cover. The back plate can be positioned between the membrane horn switch and the air bag and to provide a flat backing surface for the membrane horn switch.

In one embodiment, the fabric envelope includes a slot cut into the fabric including a series of tear tabs which are configured to tear during air bag deployment allowing the air bag to expand outside of the sub-module. In a second embodiment, a tear seam is included comprising a weak stitch pattern of thin thread which is configured to pull apart and release the air bag upon deployment.

The inflator is designed with an integral round flange surrounding the inflator which is used for mounting the sub-module onto the mounting plate of the steering wheel. The flange can have bolts staked to it which can extend through holes in the mounting plate to be secured by nuts to the mounting plate. During installation, the inflator can be inserted into the air bag, the air bag can be folded and the fabric envelope can be wrapped around the folded air bag. The air bag and envelope are trapped in place between the inflator flange and mounting plate when the sub-module is installed into the steering wheel.

Further objects, features and advantages of the invention will become apparent from a consideration of the following description and the appended claims when taken in connection with the accompanying drawings.

DETAILED DESCRIPTION OF THE PREFERRED EMBODIMENT

Preferred embodiments of the supplemental restraint sub-module of the present invention are described herebelow with reference to the drawings.

Figure 1:
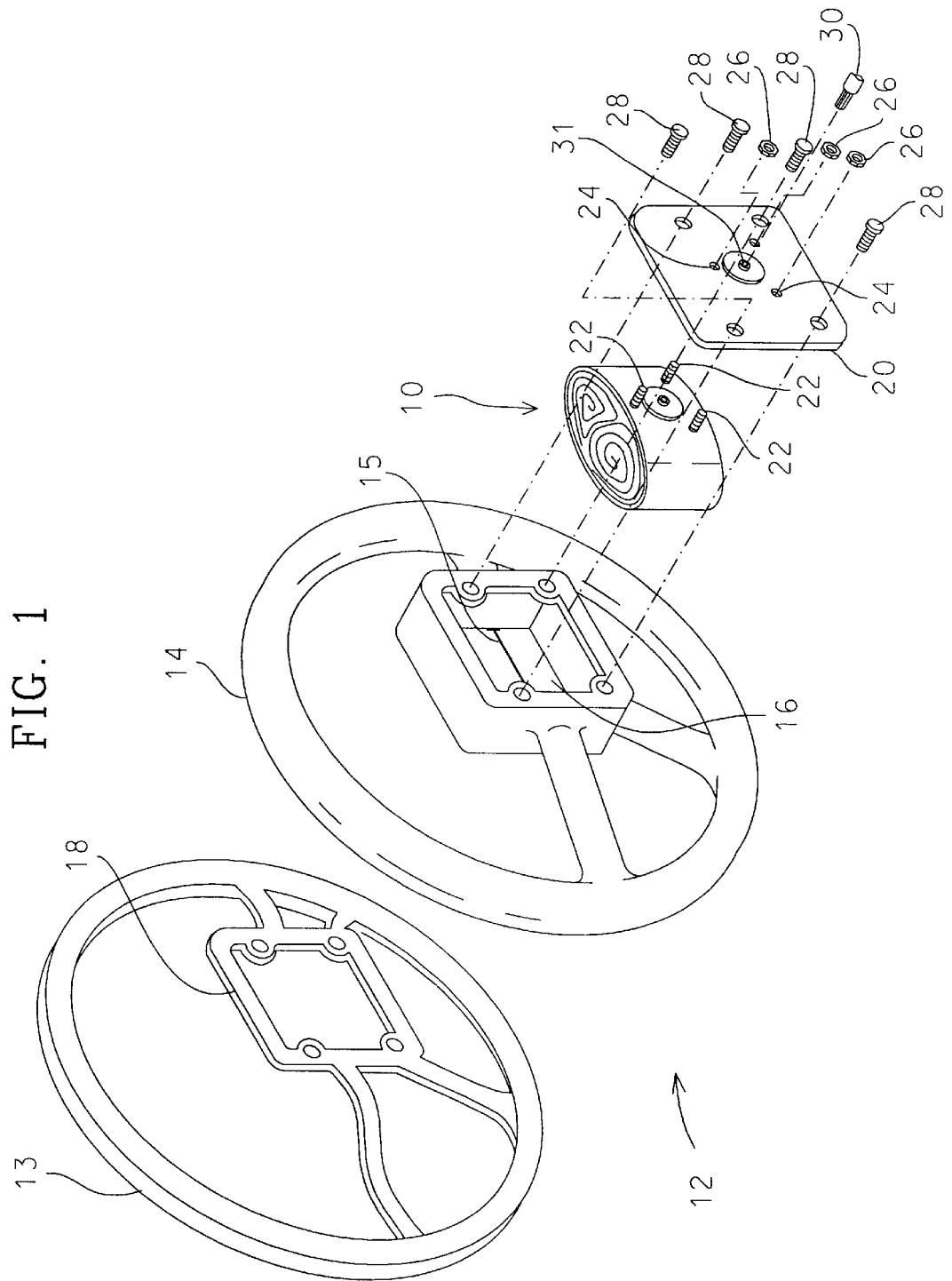
FIG. 1 is a pictorial view of a steering wheel and the sub-module of the present invention.
Figure 2:
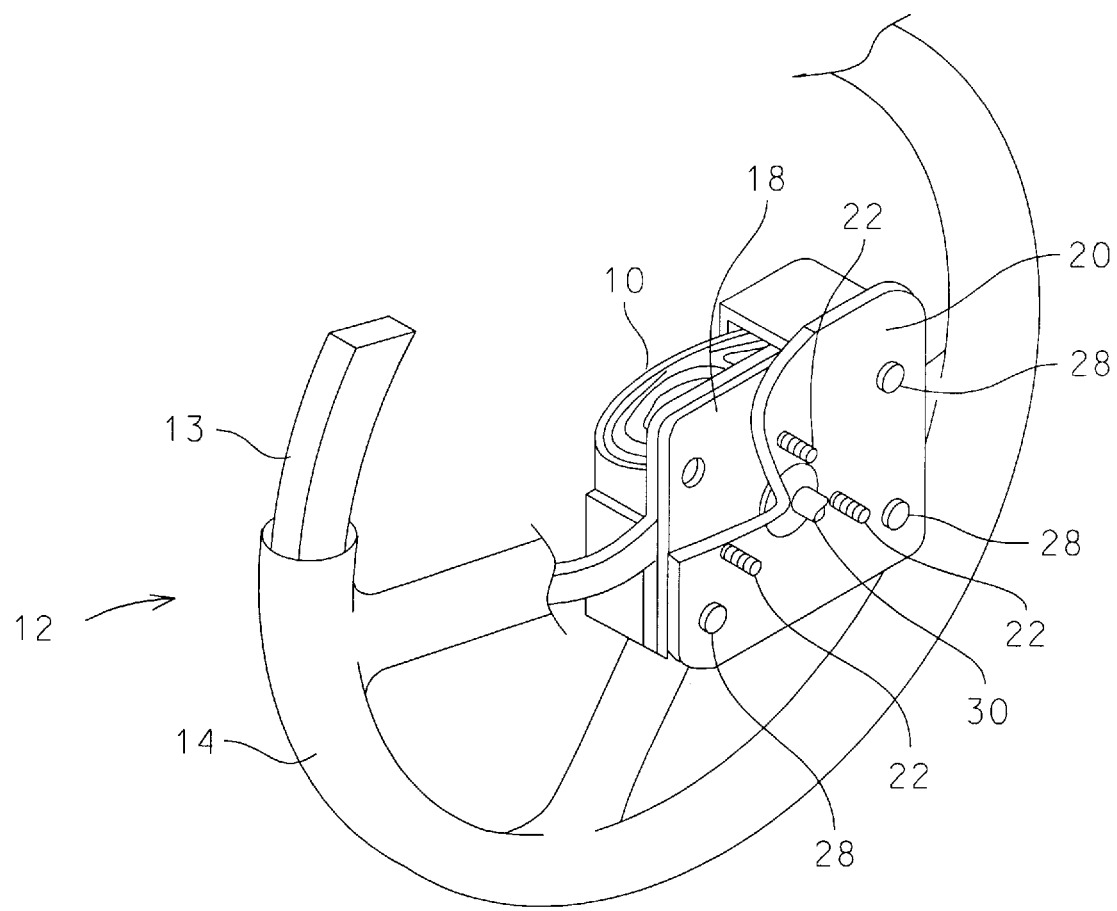
FIG. 2 is a partial cross-sectional view of the sub-module of the present invention installed in a vehicle steering wheel.
Figure 3:
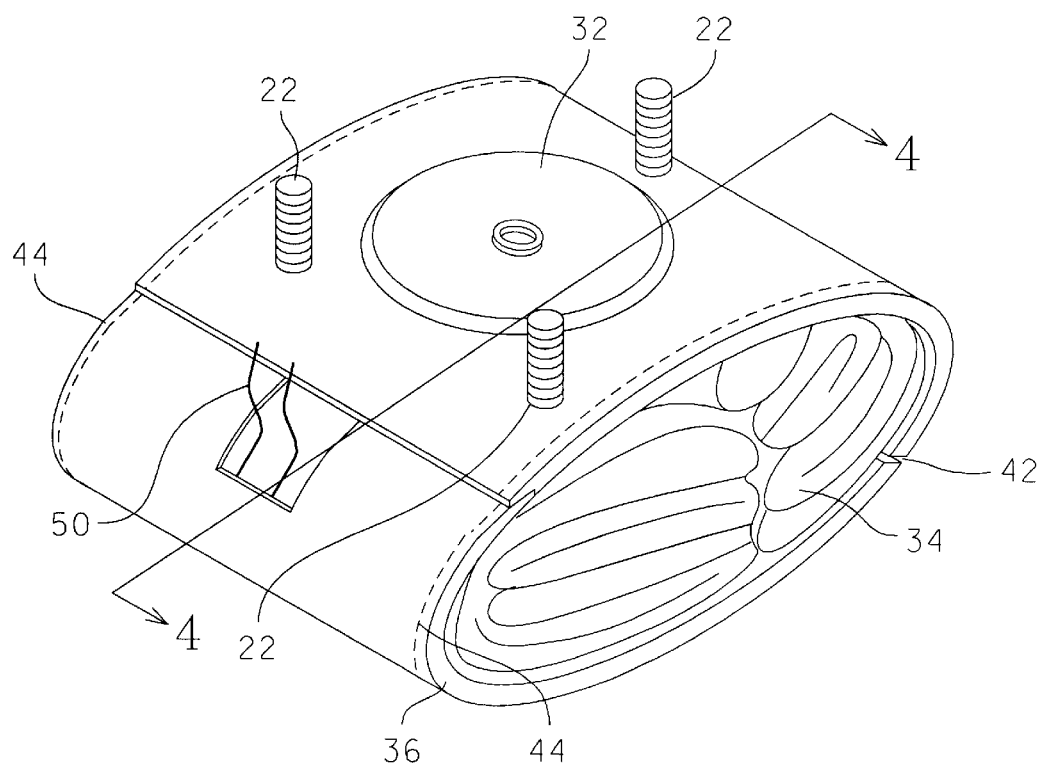
FIG. 3 is a pictorial view of an assembled sub-module of the present invention, illustrating the sub-module mounting means.
Figure 4:
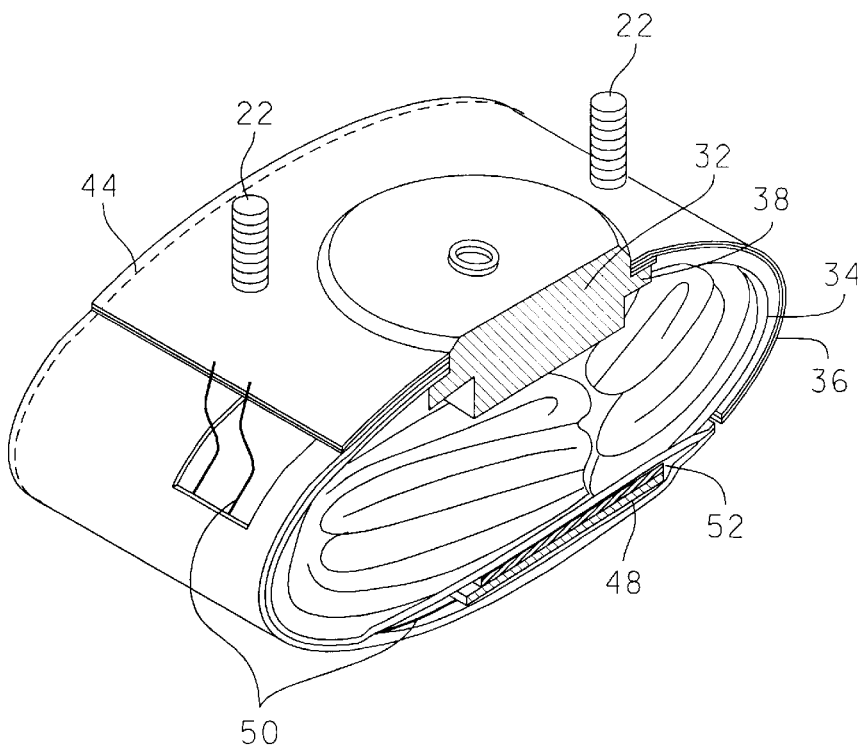
FIG. 4 is a cross-sectional view of the sub-module taken along line 4—4 of FIG. 3.
Figure 5:
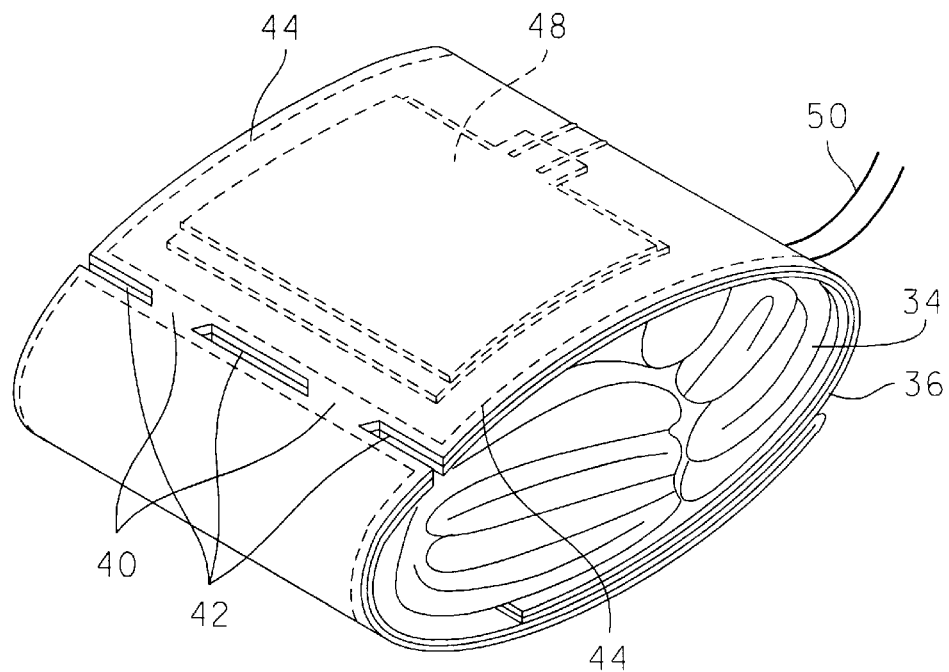
FIG. 5 is a pictorial view of a first embodiment of the assembled sub-module of the present invention, illustrating the fabric envelope tear tabs.

Referring to FIGS. 1 and 2, the supplemental restraint sub-module, indicated generally at 10, is configured for integrated use with a vehicle steering wheel assembly 12, having an aesthetic urethane molded cover 14 which is molded over armature 13. The steering wheel assembly 12 forms a molded well 16 within the central hub portion 18 of the steering wheel assembly. The cover 14 also includes tear seams 15 which are configured to rupture and open upon air bag deployment, allowing the air bag 34 to inflate outside of the steering wheel assembly 12. The cover 14 is designed to remain attached to the steering wheel assembly 12 during air bag deployment.

During assembly, the sub-module 10 is placed inside the molded well 16 and is held in place by a mounting plate 20. The sub-module 10 is secured to the mounting plate 20 by three threaded bolts 22 extending from the sub-module 10, through holes 24 in the mounting plate 20. The bolts 22 engage threaded nuts 26 on the back side of the mounting plate 20. The mounting plate 20 is secured to the steering wheel assembly 12 by screws 28 inserted through the mounting plate 20 into the cover 14 and steering wheel 12. A steering shaft 30 having a splined end is accepted into the mounting plate hole 31 to secure the steering wheel/sub-module assembly to the vehicle. It is contemplated that other fasteners, such as rivets, ball locks, etc., could be used for securing the parts as well as adhesive bonding or post-assembly forming operations to interlock the parts together.

Details of the sub-modules will now be discussed with reference to FIGS. 3–6. The supplemental restraint sub-module 10 comprises an inflator 32, an air bag 34, and a fabric envelope 36. The inflator 32 is configured for receiving a crash signal from a crash sensor (not shown) and for generating inflation gas in response to the crash signal. In the preferred embodiment, the inflator 32 includes an integral round flange 38 to which bolts 22 are staked. It is contemplated that the inflator 32 can be a stored gas, solid propellant or hybrid type inflator.

The air bag 34 includes a mouth opening into which the inflator 32 is placed when the sub-module 10 is assembled. During assembly, the air bag 34 is folded and the fabric envelope 36 is wrapped around the air bag/inflator assembly to hold the sub-module 10 together. In the preferred embodiment, the fabric envelope 36 comprises a sheet of material folded over and sewn together by sewn seams 44 along the outside edges of the envelope 36 to form an elongated pocket sleeve. Alternatively, the fabric envelope 36 can be made from two or more separate sheets of material sewn together to form an elongated pocket sleeve.

Figure 6:
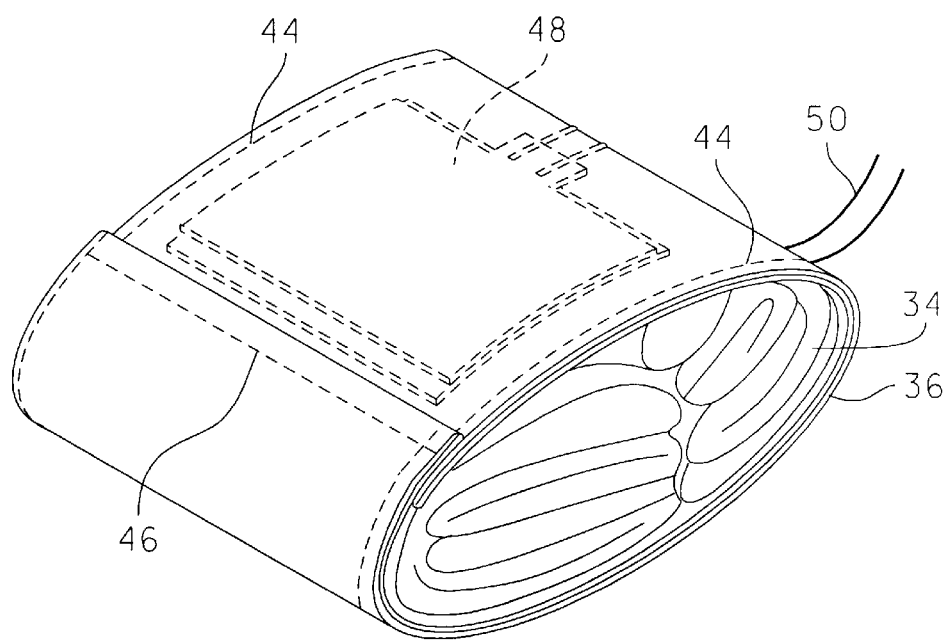
FIG. 6 is a pictorial view of a second embodiment of the assembled sub-module of the present invention, illustrating the envelope tear seam.

Tear tabs 40 are included in a slot 42 on the envelope 36 to hold the envelope 36 together. The tear tabs 40 are only strong enough to retain the folded air bag 34. When the inflator 32 starts to generate gas and fill the air bag 34, the tear tabs 40 rip apart and release the air bag 34. In an alternative embodiment, as shown in FIG. 6, the slot 42 and tear tabs 40 are replaced with a tear seam 46. The tear seam 46 comprises a weak stitch pattern of thin thread which is configured to pull apart and release the air bag 34 as the air bag 34 is inflated by gases from the inflator 32. In the case of either embodiment, as inflator 32 generates gas causing deployment of the air bag 34, mounting plate 20 and steering wheel assembly well 16 combine to act as reaction surfaces which cause the bag to deploy properly.

A membrane horn switch 48 can be integrated into the sub-module 10, by sewing the switch 48 into the pocket sleeve of the envelope 36. The switch 48 is positioned between the layers of fabric in the envelope 36 and sewn into place so that when the sub-module 10 is assembled into the well 16 the horn switch 48 is located beneath the steering wheel cover 14. When the cover 14 is pressed, the horn switch 48 is deformed allowing current to flow through wires 50 exiting the sub-module 10 to the vehicle horn (not shown). A backing plate 52 can be included between the horn switch 48 and the air bag 34 to provide a flat backing surface for the horn switch 48.

It is to be understood that the invention is not limited to the exact construction illustrated and described above, but that various changes and modifications may be made without departing from the spirit and scope of the invention as defined in the following claims.

I claim:

1. A supplemental restraint sub-module for assembly with a vehicle steering wheel assembly forming a well portion and having a mounting plate for enclosing the well portion, the sub-module comprising:

an air bag;

an inflator positioned inside of said air bag;

at least one fastener for fastening said sub-module to the steering wheel assembly;

a fabric envelope having a deployment failure area, said envelope configured to enclose said air bag and said inflator when said air bag is in a folded uninflated condition, wherein said enclosed air bag and inflator are configured for insertion into the steering wheel assembly well portion, said deployment failure area fails upon inflation of said air bag allowing said air bag to expand outside of said sub-module; and a membrane horn switch positioned inside said fabric envelope, said horn switch configured to deform upon pressing on a portion of the vehicle steering wheel causing current to flow to a horn.

2. The sub-module of claim 1 further comprising a backing plate positioned between said membrane horn switch and said air bag, said backing plate configured for providing a flat backing surface for said membrane horn switch.

3. The sub-module of claim 1 wherein said inflator defines a perimeter flange with said at least one fastener engaging said flange such that said at least one fastener secures said air bag when said sub-module is mounted for use.

4. The sub-module of claim 1 wherein said failure area further comprises at least one tear tab configured to tear apart upon said air bag inflation.

5. The sub-module of claim 1 wherein said failure area further comprises a tear seam configured to pull apart upon said air bag inflation.

6. A supplemental restraint sub-module for assembly with a vehicle steering wheel assembly forming a well portion having a closed cover over the well portion exposed to the front of said steering wheel assembly facing the vehicle driver and having a mounting plate for enclosing an open back side of the well portion, said sub-module comprising:

an air bag;

an inflator positioned inside of said air bag, said inflator including an integral flange configured for mounting said sub-module, said air bag being secured by said flange when said sub-module is mounted for use;

a plurality of fasteners engaging said integral flange for mounting said sub-module;

a fabric envelope having a deployment failure area, said envelope configured to enclose said air bag and said inflator when said air bag is in a folded uninflated condition, wherein said enclosed air bag and inflator are configured for insertion into the steering wheel assembly well portion, said deployment failure area being configured to fail upon inflation of said air bag allowing said air bag to expand outside of said sub-module; and a membrane horn switch positioned beneath the cover inside said fabric envelope, said horn switch configured to deform upon pressing on the closed cover causing current to flow to a horn.

7. The sub-module of claim 6 futher comprising a backing plate positioned between said membrane horn switch and said air bag, said backing plate configured for providing a flat backing surface for said membrane horn switch.

8. The sub-module of claim 6 wherein said failure area further comprises at least one tear tab configured to tear apart upon said air bag inflation.

9. The sub-module of claim 6 wherein said failure area further comprises a tear seam configured to pull apart upon said air bag inflation.

* * * * *